United States Patent [19]

Straniti

[11] 3,902,314
[45] Sept. 2, 1975

[54] GAS TURBINE ENGINE FRAME STRUCTURE

[75] Inventor: Salvatore Straniti, Orange, Conn.

[73] Assignee: Avco Corporation, Stratford, Conn.

[22] Filed: Nov. 29, 1973

[21] Appl. No.: 420,200

[52] U.S. Cl. .................................................. 60/39.31
[51] Int. Cl.² .......................................... F02C 7/20
[58] Field of Search............. 60/39.16, 39.36, 39.31, 60/39.32; 415/218, 217, 182, 196

[56] References Cited
UNITED STATES PATENTS

| | | | |
|---|---|---|---|
| 2,580,207 | 12/1951 | Whittle | 60/39.32 |
| 2,812,898 | 11/1957 | Buell | 60/39.16 |
| 3,088,278 | 5/1963 | Franz | 60/39.16 R |
| 3,093,969 | 6/1963 | Moellmann | 60/39.16 |
| 3,287,905 | 11/1966 | Bayard | 60/39.36 |
| 3,546,880 | 12/1970 | Schwaar | 60/39.16 |
| 3,589,132 | 6/1971 | DuPont | 60/39.16 |
| 3,704,075 | 11/1972 | Karstensen et al. | 60/39.16 |
| 3,722,215 | 3/1973 | Zhdanoy et al. | 60/39.32 |

FOREIGN PATENTS OR APPLICATIONS

| | | | |
|---|---|---|---|
| 1,164,675 | 5/1958 | France | 60/39.36 |
| 1,094,540 | 12/1967 | United Kingdom | 60/39.36 |

Primary Examiner—William L. Freeh
Assistant Examiner—L. J. Casaregola
Attorney, Agent, or Firm—Charles M. Hogan; Irwin P. Garfinkle; Gary M. Gron

[57] ABSTRACT

A gas turbine engine has an integral cast aft frame which includes an aft bearing housing interconnected by means of struts with sections defining the hot gas flow path through the frame. The frame structure has a flange section in line with the periphery of a power turbine rotor to provide improved blade retention. An inlet nozzle for the power turbine is mounted at the aft end of one of the wall sections in such a way that radial expansion of the nozzle is accommodated.

4 Claims, 3 Drawing Figures

GAS TURBINE ENGINE FRAME STRUCTURE

The present invention relates to gas turbine engines and more particularly to frame structures for this type of engine.

The traditional method of manufacturing a gas turbine engine has been to provide a series of ringlike elements secured to one another axially through the use of interfitting flanges or radially through fabricated struts. This type of construction, particularly in the hot section of the engine, greatly increases the complexity and cost of assembling the engine. The reason for this is that individual components must be manufactured and then assembled into the completed unit. In addition, the flange sections providing the interface between the various components become a source of leaks and potential maintenance problems.

In accordance with the present invention these problems are solved by a one-piece rear frame for a gas turbine engine. The frame comprises a central annular bearing support housing, a first annular wall section positioned radially outward from the base for defining the inner bounds of an annular hot gas stream flowpath through the frame. A plurality of inner radial struts interconnect the first annular wall section and the bearing housing. A second annular wall section is positioned radially outward of the first wall section for defining the outer bounds of the annular flowpath, the second annular wall section extending axially beyond the axial length of the first wall section and the bearing housing. A plurality of outer radial struts interconnect the first and second wall sections, the outer struts being formed as extensions of the inner struts. A flange section extends radially outward from the second annular wall section at a point axially displaced from the first wall section and the bearing housing, the flange being curved generally forward to form the aft end of an outer housing for the gas turbine engine.

The above and other related features of the present invention will be apparent from a reading of the following description of the disclosure shown in the accompanying drawings and the novelty thereof pointed out in the appended claims.

Figure 1:
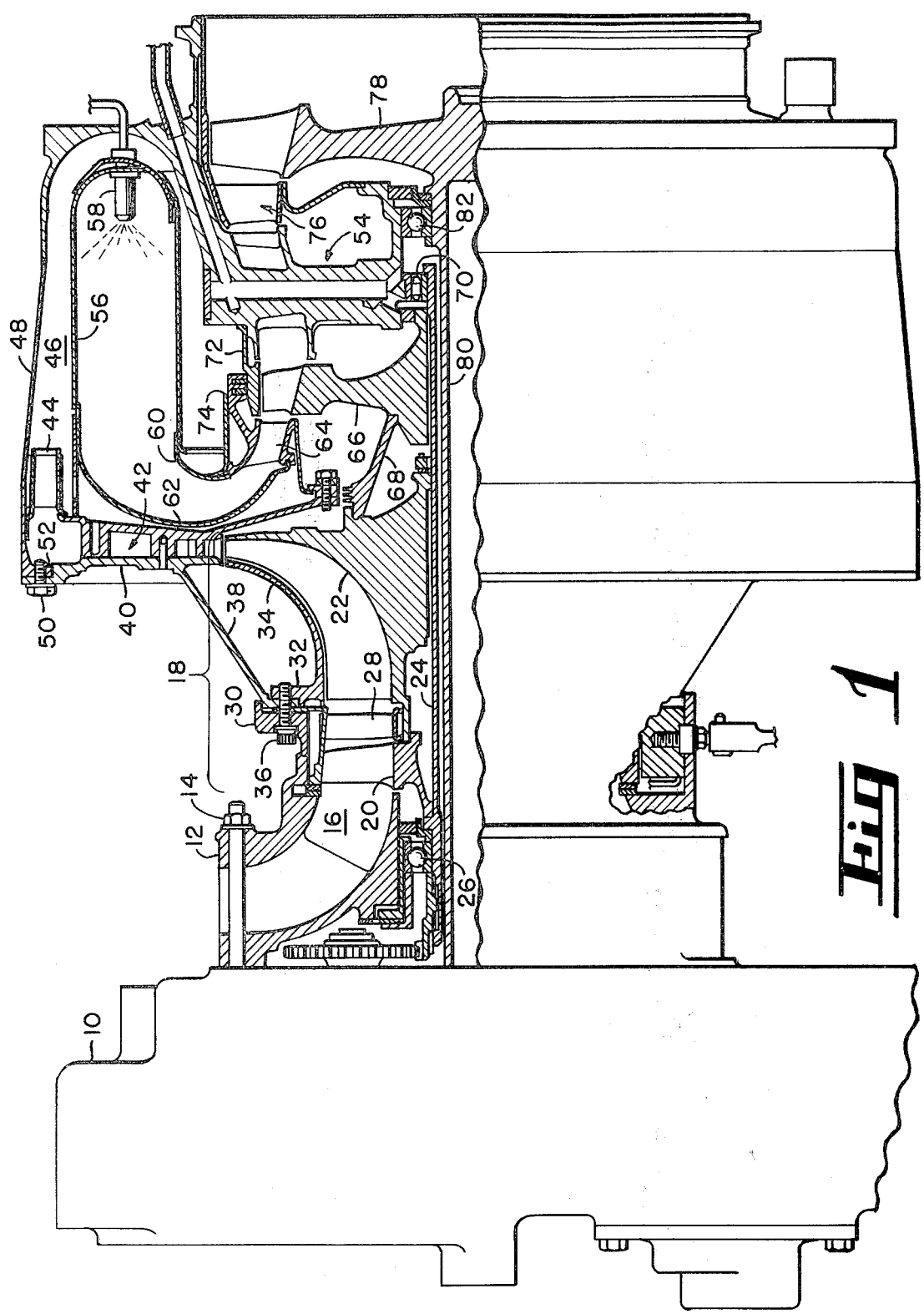
FIG. 1 is a simplified longitudinal section view of a gas turbine engine incorporating a rear frame structure which embodies the present invention.

Referring to FIG. 1 there is shown a gas turbine engine comprising an output gearbox 10 which has an annular inlet housing 12 secured to it by bolt assemblies 14. Housing 12 has an annular inlet 16 which provides an entry for ambient air to a compressor 18. Compressor 18 comprises a bladed axial flow hub 20 and a downstream centrifugal impeller 22 both secured over a central shaft 24. Shaft 24 is journaled by forward bearing assembly 26 which is mounted in inlet housing 12.

An axial flow stator assembly 28 is positioned between the hub 20 and impeller 22. The stator assembly has a flange 29 sandwiched between a flange 30 at the aft end of inlet housing 12 and a flange 32 integral with an annular shroud 34 for impeller 22. In addition, a conical structural element 38 is sandwiched between flanges 30 and 32. The stacked flanges are held together by screws 36.

Element 38 extends to an annular flange 40 forming a portion of the outer housing for the engine and a wall of a diffuser assembly, generally indicated at 42. Preferably, diffuser 42 may incorporate the principles set forth in copending patent application Ser. No. 420,201, filed Nov. 29, 1973, entitled "Two-Piece Channel Diffuser," Stein et al. inventors, and of common assignment with the present invention. Air that has been discharged from the impeller 22 passes through passages in the diffuser 42 where its static pressure is increased.

Air then passes through a straightening vane assembly 44 and into a chamber 46, defined in part by an annular thin-wall outer housing 48. Housing 48 is mounted on flange element 40 by screws 50 threaded into a flange section 52 secured to the forward end of wall section 48. Chamber 46 is further defined by an annular one-piece aft frame structure 54 to be described in detail later.

A perforated annular combustor 56 is positioned in chamber 46 and has a plurality of nozzles 58 (only one is shown). Nozzles 58 inject fuel into combustor 56 for mixing with the pressurized air passing inward through the perforations to produce a combustible mixture. A suitable device (not shown) is used to ignite the combustible mixture to produce a hot gas stream. This gas stream is discharged through inner and outer annular curl-shaped ducts 60 and 62, respectively, and from an annular turbine-shaped nozzle assembly 64.

The hot gas stream discharged from nozzle 64 passes across a bladed compressor turbine 66 which is also mounted on shaft 24 and spaced from compressor impeller 22 by a conical element 68. A bearing assembly 70 journals the aft end of shaft 24 in frame housing 54. An annular shroud assembly 72 is closely positioned to the periphery of bladed hub 66 and is removably mounted to frame structure 54 by suitable fasteners (not shown). A pair of inwardly contracting piston rings 74 carried by nozzle assembly 64 provide a sealed sliding connection relative to shroud 72.

The hot gas stream discharged from turbine 66 then passes through strut frame 54, through a power turbine inlet nozzle assembly 76 and across a bladed power turbine assembly 78 for discharge to the atmosphere. Power turbine rotor 78 has an integral central shaft 80 which is journaled by bearing assembly 82 in frame structure 54 and extends forward to a speed-reduction gearset (not shown) in gearbox 10.

Figure 2:
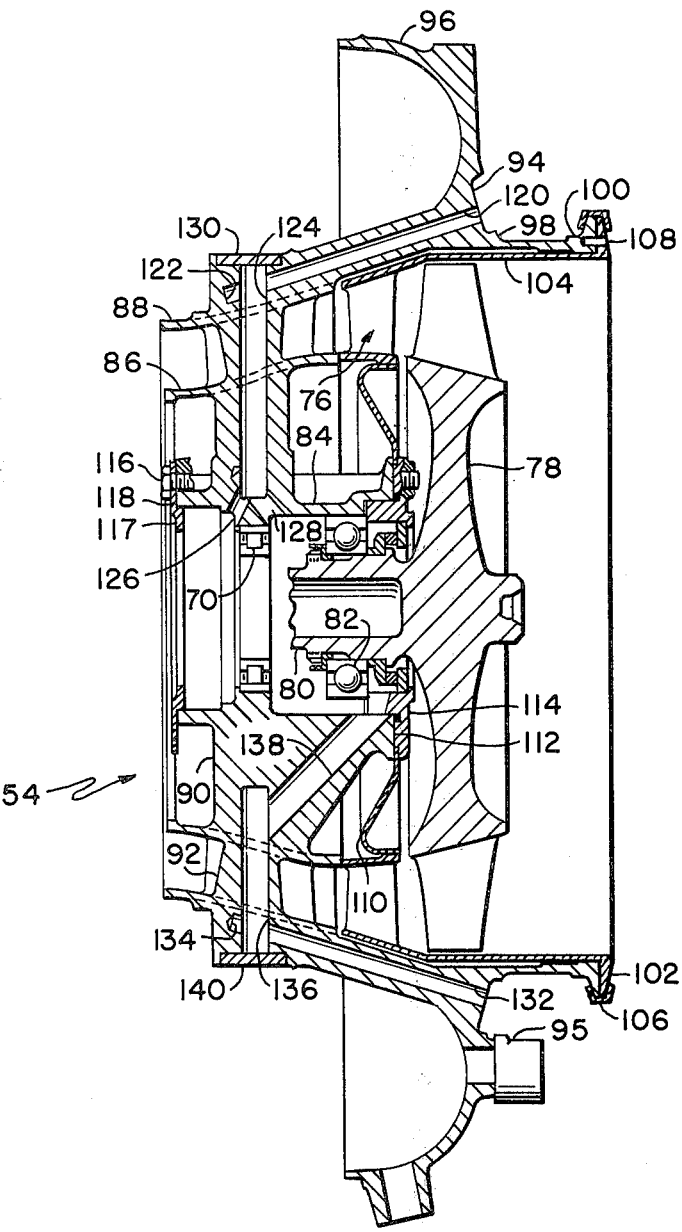
FIG. 2 is a greatly enlarged longitudinal section view of the rear frame for the gas turbine engine of FIG. 1 along with a power turbine and nozzle which it supports.
Figure 3:
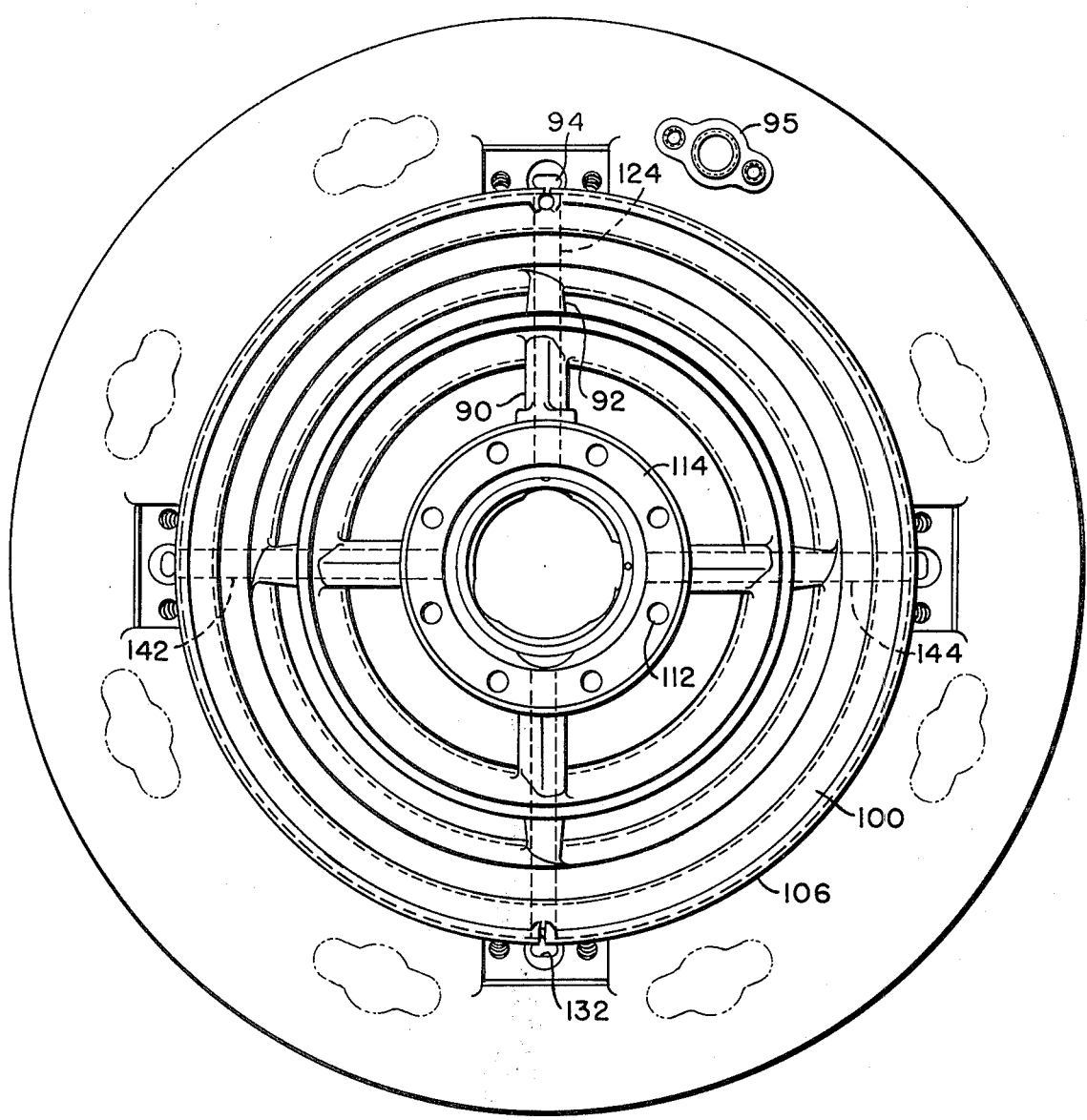
FIG. 3 is an end view of the frame structure of FIG. 2 taken on line 3—3 of FIG. 2 and shown without the power turbine and nozzle illustrated in FIG. 2.

Referring particularly to FIGS. 2 and 3, the frame structure 54 comprises a cast unitary structure comprised of an inner annular bearing support housing 84 which mounts the bearings 70 and 82 through suitable retaining devices. A first annular wall section 86 is positioned radially outward from the bearing housing 84 and forms the inner bounds of the hot gas flow path between the compressor turbine rotor 66 and the power turbine rotor 78. A second annular wall section 88 is positioned outward from section 86 to form the outer bounds of the same annular flowpath. A plurality of radial inner struts 90 interconnect bearing housing 84 and the first wall section 86. A plurality of radial outer struts 92 having a streamlined cross-section shape interconnect wall sections 86 and 88 across the hot gas flowpath. Struts 92 are formed as extensions of struts 90, as particularly shown in FIG. 3. Preferably there are four inner and outer struts positioned at 90° intervals.

The second annular wall section 88 extends in an aft direction beyond the axial length of the inner wall section 86 where it connects with a flange section 94 extending radially outward. Flange section 94 has an outer section 96 curving forward so that it may be joined with outer shell 48 through a suitable means, such as welding (see FIG. 1). Flange section 94 also has a plurality of bosses 95 that form mounting pads for fuel nozzles 58. The second wall section 88 has an extension 98 projecting aft of flange section 94.

Extension 98 has a tapered end flange 100 receiving an end flange 102 of a power turbine nozzle shroud 104. The flanges 100 and 102 are releasably held together using a Marmon clamp 106. A pin 108 extends through axially aligned holes to provide an antirotation device for the shroud 104.

As stated above, nozzle assembly 76 is positioned ahead of the power turbine rotor 78. The nozzle assembly 76 is mounted at its outer periphery by the forward end of the turbine shroud 104. An inner annular curved thin-wall section 110 projects radially inward and has its inner diameter sandwiched between the aft face 112 of the bearing housing 84 and an annular end cap 114 releasably mounted to the bearing housing 84 by bolts 116 extending to a flange 117 at the forward face 118 of housing 84. The free form of wall section 110 is such that it is resiliently biased against either the end face 112 or cap 114 to maintain a proper seal between the two and still permit relative thermal expansion.

The bearing housing 84 requires a series of passages providing access to the bearing housing for various purposes. As shown in FIG. 2, one of these passages comprises an air vent defined by a generally axial passage 120 extending from a point adjacent the base of flange 94 forward to an end 122 in line with the outer end of the strut 92 that is at the 12 o'clock position, as viewed in FIG. 3. This passage is intersected by a passage 124 extending radially inward from the periphery of the wall section 88 and through the struts 92 and 86 at the 12 o'clock position. Angled passages 126 and 128 provide access to the interior of the bearing housing and a suitable cap 130 in the end of passage 124 closes it off so that the bearing cavity can be properly vented.

A similar passage 132 is directed generally axially from the base of the flange section 94 forward to an end 134 in line with the radially outward portion of the strut 92 at the 6 o'clock position (FIG. 3). Passage 132 is intersected by a radial passage 136 extending through strut 92 at the 6 o'clock position. Passage 136 is intersected by an angled passage 138 extending inward through strut 90 at the 6 o'clock position to the aft end of the bearing housing 84 for scavenging lubricating fluid. A suitable plug 140 is provided in the open end of passage 36 to seal it off. Similar sets of passages, generally indicated at 142 and 144 (shown as the 9 o'clock and 3 o'clock positions, respectively, in FIG. 3) provide access for lubricating fluid and seal pressurization and turbine cooling air.

The above frame structure 54 is conveniently and economically manufactured as a cast one-piece unit. This provides a very substantial reduction in manufacturing cost since the requirement for carefully assembly components is substantially minimized. Furthermore, there are no flange interfaces across a pressure differential that could create leakage.

It should be noted that all of the passages carrying pressurized fluid are contained with the cast elements of the frame and include no removable interfaces which could be a source of leaks.

During operation of the engine any thermal expansion in the struts 92 and 90 is accommodated since they are positioned axially away from the flange section 94. Furthermore, the flange 94 is in line with the periphery of the bladed rotor 78 thereby providing a significant blade retention section. The turbine nozzle assembly is cantileverally supported at the aft flange 100 so that any expansion of this element follows that of the turbine rotor 78 to maintain close peripheral tolerances for high efficiency.

The frame structure and the corresponding elements defining the combustor housing 46 may be conveniently removed from the remainder of the engine as a unit to facilitate maintenance. The mounting of the shroud 104 through the Marmon clamp 106 enables a greatly simplified disassembly for inspection or replacement.

While the preferred embodiment of the present invention has been described, it should be apparent to those skilled in the art that it may be practiced in other forms without departing from its spirit and scope.

Having thus described the invention, what is claimed as novel and desired to be secured by Letters Patent of the United States is:

1. A one-piece cast rear frame for a gas turbine engine, said gas turbine engine comprising a compressor section, a turbine section, an annular combustor section surrounding said turbine section, a diffuser section, and an outer housing for said sections, said diffuser carrying air from said compressor to the outer periphery of said annular combustor through a folded annular passage, said housing providing the outer periphery of said passage, said frame comprising:

a central annular bearing support housing, a first annular wall section positioned radially outward from said bearing support housing for defining the inner bounds of an annular hot gas stream flowpath from said combustor through said frame, and a plurality of inner radial struts interconnecting said first annular wall section and said bearing housing;

a second annular wall section positioned radially outward of said first wall section for defining the outer bounds of said annular flowpath, said second annular wall section extending axially beyond the axial length of said first wall section and said bearing housing;

a plurality of outer radial streamlined struts interconnecting said first and second wall sections, said outer struts being cast as extensions of said inner struts;

a cast integral flange section extending radially outward from said second annular wall section at a point axially displaced from said first wall section and bearing housing, said flange being curved forward to form the aft end of said outer housing for said engine, the space between said combustor and said outer housing and said second annular wall section defining said folded annular passageway; and wherein said inner and outer struts of said frame are provided with access passages extending radially inward through said inner and outer struts to said bearing housing, and wherein said outer wall section has at least one generally axially extending passage radially intersecting the passage in the outer end of one of said outer struts.

2. A one-piece cast rear frame for a gas turbine engine, said gas turbine engine comprising a compressor section, a turbine section, an annular combustor section surrounding said turbine section, a diffuser section, and an outer housing for said sections, said diffuser carrying air from said compressor to the outer periphery of said annular combustor through a folded annular passage, said housing providing the outer periphery of said passage, said frame comprising:

a central annular bearing support housing, a first annular wall section positioned radially outward from said bearing support housing for defining the inner bounds of an annular hot gas stream flowpath from said combustor through said frame, and a plurality of inner radial struts interconnecting said first annular wall section and said bearing housing;

a second annular wall section positioned radially outward of said first wall section for defining the outer bounds of said annular flowpath, said second annular wall section extending axially beyond the axial length of said first wall section and said bearing housing;

a plurality of outer radial streamlined struts interconnecting said first and second wall sections, said outer struts being cast as extensions of said inner struts;

a cast integral flange section extending radially outward from said second annular wall section at a point axially displaced from said first wall section and bearing housing, said flange being curved forward to form the aft end of said outer housing for said engine, the space between said combustor and said outer housing and said second annular wall section defining said folded annular passageway;

a power turbine in said turbine section, said power turbine including a bladed power turbine rotor positioned radially in line with said flange section;

a bearing assembly mounted in said bearing support housing and journaling said power turbine rotor; and an annular shroud for said turbine forming the outer bounds of the hot gas stream from said first and second wall sections and across said turbine, said shroud being secured to said second annular wall section, said second wall section having an end extending axially beyond said flange section, said shroud extending at least as far as said second wall section, said shroud being secured to said second annular wall section at said end.

3. Apparatus as in claim 2 wherein:

said shroud has an integral tapered radial flange at its end;

said second wall section has a tapered radial flange at its end mating with the flange on said shroud; and said apparatus further comprises a Marmon clamp releasably engageable over said flanges.

4. Apparatus as in claim 3 further comprising a pin extending through axial holes in said flanges thereby preventing said shroud from rotating relative to said second annular wall section.

* * * * *